United States Patent
Sarkar et al.

(10) Patent No.: US 7,624,743 B2
(45) Date of Patent: Dec. 1, 2009

(54) METHODS AND COMPOSITIONS FOR THERMALLY TREATING A CONDUIT USED FOR HYDROCARBON PRODUCTION OR TRANSMISSION TO HELP REMOVE PARAFFIN WAX BUILDUP

(75) Inventors: Diptabhas Sarkar, Houston, TX (US); Stephen T. Arrington, Duncan, OK (US); Ronald J. Powell, Duncan, OK (US); Ian D. Robb, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 417 days.

(21) Appl. No.: 11/521,530

(22) Filed: Sep. 14, 2006

(65) Prior Publication Data

US 2008/0066784 A1 Mar. 20, 2008

(51) Int. Cl.
*B08B 9/027* (2006.01)
*B08B 7/00* (2006.01)

(52) U.S. Cl. .......................... 134/22.11; 134/5; 134/6; 134/19; 134/22.16

(58) Field of Classification Search ............... 134/5, 134/19, 22.1–22.19, 30, 35, 36, 40
See application file for complete search history.

(56) References Cited

U.S. PATENT DOCUMENTS

| | | | | |
|---|---|---|---|---|
| 4,561,981 A | * | 12/1985 | Characklis | 210/696 |
| 4,669,544 A | * | 6/1987 | Nimerick | 166/300 |
| 4,755,230 A | * | 7/1988 | Ashton et al. | 134/22.14 |
| 5,051,261 A | * | 9/1991 | McGinity et al. | 424/464 |
| 5,382,601 A | * | 1/1995 | Nurnberg et al. | 514/775 |
| 6,003,528 A | * | 12/1999 | De Souza et al. | 134/22.1 |
| 6,444,316 B1 | * | 9/2002 | Reddy et al. | 428/407 |
| 6,830,105 B2 | * | 12/2004 | Thesing | 166/280.1 |

* cited by examiner

*Primary Examiner*—Michael Kornakov
*Assistant Examiner*—Natasha Campbell
(74) *Attorney, Agent, or Firm*—Robert A. Kent; Booth Albanesi Schroeder LLC

(57) ABSTRACT

Methods are provided for increasing the temperature of a section of conduit used for the production or transmission of hydrocarbon. According to one aspect, the method includes the steps of: (a) forming a treatment fluid comprising: (i) a carrier fluid; and (ii) a first reactant and a second reactant; and (b) introducing the treatment fluid into a section of conduit used for the production or transmission of hydrocarbon. The first reactant and second reactant are selected for being capable of reacting together in an exothermic chemical reaction; and the first and second reactant are in at least sufficient concentrations in the carrier fluid to generate a theoretical heat of reaction of at least 1,000 kJ/liter of the treatment fluid. At least some of at least one of the first reactant and the second reactant is suspended in the carrier fluid in a solid form that is adapted to help control the release of the reactant into the carrier fluid.

21 Claims, 8 Drawing Sheets

METHODS AND COMPOSITIONS FOR THERMALLY TREATING A CONDUIT USED FOR HYDROCARBON PRODUCTION OR TRANSMISSION TO HELP REMOVE PARAFFIN WAX BUILDUP

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The invention generally relates to the methods for warming a conduit used for hydrocarbon production or transmission to help remediate paraffin wax buildup. More particularly, the invention relates to forming a treatment fluid with reactants that react exothermically to produce heat in a controlled manner and introducing the treatment fluid into the conduit to warm the pipeline. The heat can be used to help remove paraffin wax deposits.

BACKGROUND

Hydrocarbon, such as crude oil, for making various grades of fuels and oils, is produced by drilling wells into the earth, either on land or under sea. Crude oil contains many kinds of hydrocarbons, including paraffin wax.

Paraffin wax deposition is found practically whenever hydrocarbon (e.g., crude oil) is produced and transported. Paraffin wax deposition obstructs the flow of oil, lowering oil production and interfering with transportation.

Paraffin wax deposits are typically made up of linear, saturated hydrocarbon chains (typically $C_{16}$ to $C_{80}$) admixed to branched hydrocarbons, asphaltenes, water, and inorganic compounds such as sand, rust, iron sulfide, clays, etc. The deposit hardness depends chiefly on the oil amounts and mineral substances present in the mixture.

The phenomenon of the deposition or precipitation of solid paraffin wax constitutes an example of fluid/solid phase equilibrium, which is explained in the light of the principles of solution thermodynamics. At higher pressures and temperatures, the higher molecular weight hydrocarbon of paraffin wax is dissolved in lower molecular weight hydrocarbon, which functions as a solvent for the paraffin.

The paraffin wax deposition mechanism depends on pressure and temperature. Generally, lower pressures tend to increase the cloud point temperature. The cloud point temperature range of several waxy crude oils is such that the wax can precipitate even on the formation face as well as within the formation throughout the pressure reduction phenomenon which normally occurs during the useful life of the well. The lowering in production rate can be wrongly attributed to the reservoir depletion, while many times it is due to the formation permeability reduction and/or to the reduction of the diameter of the production string.

Hydrocarbon chains of different lengths are present in varying percentages as well as melting points, becoming insoluble at different pressure and temperature conditions. Generally, paraffin wax precipitation from hydrocarbon is gradual.

Paraffin wax is a dissolved component of relatively hot crude oil. For example, subterranean formations bearing hydrocarbon are usually under high pressure and at temperatures that are higher than 120° F. (49° C.). The formation temperatures of deep formations are usually much higher than 120° F. (49° C.). But paraffin wax tends to precipitate from crude oil as waxy solid deposits when the pressure and temperature is lowered as the hydrocarbon is produced and as the crude oil cools down.

After the hydrocarbon flows from a subterranean formation at relatively high temperature into the production tubulars of the wellbore, it is transported through the tubulars of the wellbore to the wellhead. Further, the hydrocarbon produced at the wellhead must be transported to a refinery to be processed and separated into various components, e.g., to make various grades of fuels and oils. The most common method of transporting hydrocarbon is through pipelines.

But as crude oil flows through the production tubulars from the hydrocarbon-bearing formation through the wellbore toward the surface, the surrounding temperature of the wellbore tends to decline toward the surface, allowing heat to dissipate from the fluid and causing the hydrocarbon fluid to begin to cool. Further, as the crude oil is moved through cross-country pipelines, it can loose heat energy to the ground or environment and cool to a temperature well below 120° F. (49° C.). Thus, the hot crude oil from a subterranean formation tends to be cooled as it flows through these conduits. As the temperature of the crude oil falls, paraffin wax in the crude oil tends to become a solid, waxy material that falls out of the crude oil and paraffin deposits accumulate on the inner walls of the production tubing and pipelines. This can be particularly problematic in subsea pipelines because the surrounding water on the seafloor is very cold, typically about 39° F. (4° C.).

To help prevent paraffin deposits, some cross-country pipelines are heated, which is very costly. However, this is not feasible for subsea pipelines, which are in direct contact with the surrounding cold seawater.

As the paraffin wax deposits build up on the inside wall of a conduit, the opening for fluid flow through the pipeline becomes smaller and smaller. Unless at least some of the buildup is removed from time to time, eventually the deposits can increase to the point where the conduit becomes choked. Also, sometimes some of the paraffin deposits will release from the inside wall of a pipeline and cause a blockage. Such a blockage can occur anywhere in the pipeline. This paraffin deposition leads to reduced crude oil flow and under extreme conditions leads to complete blockage of the pipelines, as illustrated in FIG. 1.

Removal of the paraffin wax deposits is attempted through three main approaches: mechanical, thermal, and chemical. Often, a combination of two or more of these types of approaches is employed.

The mechanical approaches are used specially for production strings and pipeline conduits, as they are generally unsuitable for use in a subterranean formation or at the interface between a formation and a wellbore. In the mechanical methods, paraffin deposits are physically removed from the wall surface. Chemical surface agents and solvents can aid in the removal so that the dislodged paraffin deposits are dispersed in solution and can flow through the conduit.

The main mechanical approach for helping to clean a pipeline, including for removing paraffin buildup, is to run a mechanical device through the pipeline that scrapes the inner wall of the pipeline and pushes the paraffin through. This type of mechanical cleaning device is called a "pig" because the scraping of the inner wall of the pipeline makes a tremendous squealing noise. The pig is normally driven through the pipeline by a relatively high pumping pressure behind the pig, which is used to force the pig through the pipeline. But if paraffin buildup on the inner walls of the pipeline is heavy, as the pig moves forward it will collect so much paraffin in front of the moving pip that it blocks any further movement of the pig. In other words, as more and more paraffin is scraped off the inner walls of the pipeline and accumulates in front of the moving pig, at some point the pumping pressure in the pipeline is not enough to push the pig and all the accumulated paraffin further through the pipeline, at which point the pipeline is plugged.

The most common thermal method for removing paraffin deposits in production tubulars employs heated oil, so the technique is commonly referred to as "hot oiling." The heated oil is usually pumped through the annulus between the wellbore and a production tubular, and then back to the surface through the production tubular in order to remove the paraffin wax deposits in the production tubular. This type of approach can be safely used only for production tubulars for paraffin wax deposits above the wellbore perforations to a hydrocarbon-bearing formation. Otherwise, the heated crude oil could carry some of the melted paraffin wax into the formation where it could cool and settle in the porous spaces, plugging the formation. Techniques using heated oil can also be used in pipelines to help remove paraffin wax deposits from the conduit.

One alternative to using heated oil is to use heated water. Water has a higher thermal capacity than oil, which capacity can be used to carry more heat energy to melt paraffin wax. Thus, the paraffin wax deposits can be thermally dispersed by hot water. However, hot water does not dissolve or dilute the paraffin wax, so the water and melted paraffin wax can form an undesirable oil/water emulsion. Another disadvantage to using hot water, however, is that it can contribute to corrosion problems with the metal conduits.

In U.S. Pat. No. 3,437,146 issued Apr. 8, 1969 to Clifford R. Everhart and Audra B. Cary, the abstract describes the disclosure as a method of removing paraffin deposits from a producing well including injecting heated xylene bottoms solvent into the wellbore at a temperature sufficiently high so that the solvent is at least 150° F. (65° C.) when it encounters the producing formation, and thereafter, withdrawing the solvent and dissolved paraffin.

Organic solvents like hot xylene are able to dissolve paraffins and asphaltenes, but not the inorganic materials in the paraffin wax deposits.

Numerous attempts have been made to remediate paraffin wax buildup in hydrocarbon-bearing subterranean formations and in conduits for the production or transmission of hydrocarbon.

In U.S. Pat. No. 4,178,993 issued Dec. 18, 1979 to Edwin A. Richardson and Ronald F. Scheuerman, the abstract describes the disclosure as a method of initiating production from a gas well which is kept from producing by the hydrostatic pressure of the liquid it contains, by injecting an aqueous liquid that contains reactants which form nitrogen gas within the well or reservoir and displaces enough liquid out of the well to lower the hydrostatic pressure to less than the fluid pressure in the adjacent portion of the reservoir and cause fluid to flow from the reservoir to the well. Further, this patent discloses that the nitrogen-gas-forming mixture can be an aqueous solution of ammonium chloride and sodium nitrite; or an aqueous solution of urea and sodium hypochlorite; or an aqueous solution of urea and sodium nitrite.

In U.S. Pat. No. 4,219,083 issued Aug. 26, 1980 to Edwin A. Richardson; Ronald F. Scheuerman; and David C. Berkshire, the abstract describes the disclosure as a backsurge of fluid through perforations in a well casing that is chemically induced by injecting into the surrounding reservoir a solution which contains (a) nitrogen gas-generating reactants, (b) a reaction-retarding alkaline buffer, and (c) a pH-reducing reactant that is capable of subsequently overriding the buffer, so that a rapid production of gas and heat causes a backsurging of fluid into the wellbore. Further, this patent further discloses that the nitrogen gas-generating reactants can be a nitrogen-containing compound and oxidizing agent comprising water-soluble salts of, respectively, ammonium hydroxide and nitrous acid.

In U.S. Pat. No. 4,330,037 issued Mar. 18, 1982 to Edwin A. Richardson and Walter B. Fair, Jr., the abstract describes that a portion of a subterranean oil and water-containing reservoir is concurrently chemically heated and selectively increased in its effective permeability to oil by injecting a solution of compounds containing ammonium ions and nitrite ions, which react exothermically to generate gaseous nitrogen, and a reaction-rate-controlling buffer. The reactant concentration and the rate at which the solution is injected are arranged to provide a selected temperature increase within a selected portion of the reservoir.

In U.S. Pat. No. 4,399,868 issued Aug. 23, 1983 to Edwin A. Richardson and Walter B. Fair, Jr. the abstract describes the disclosure as fluid passageways between a well borehole and a subterranean reservoir which are both plugged and submerged within relatively dense brine that can be contacted with heat and oil solvent by arranging a nitrogen gas generating aqueous solution to be both reactive at the reservoir temperature and denser than the brine in the borehole and flowing alternating slugs of it and a liquid oil solvent into the zone to be treated. Further, this patent discloses that the solid materials that plug such fluid passageways are usually heat-sensitive and oil-solvent-soluble materials, such as paraffinic and/or asphaltenic solids. The fluid contains enough total dissolved solids to provide a solution density exceeding that of the brine in the borehole, such that a significant portion of the heating solution sinks into the column of brine in the borehole and reacts to yield heat and gas that contact the plugged fluid passageways.

U.S. Pat. No. 4,380,268 issued Apr. 19, 1983 to Keith R. Martin, the abstract describes the disclosure as recovery of gas and oil being enhanced by the removal of paraffin and other hydrocarbons from wells by flushing the wells with water containing a polymer of a primary alcohol and ethylene oxide plus sodium silicate. Further, the patent describes that the detergent degreaser comprises a polymer of a straight chain linear carbon alcohol that is ethoxylated with ethylene oxide.

In U.S. Pat. No. 4,755,230 issued Jul. 5, 1988 to Jefferson P. Ashton; Hal W. McSpadden; Tara T. Velasco; Hang T. Nguyen, the abstract describes the disclosure as a method for removing paraffin deposits from the interior of a hydrocarbon transmission conduit, such as a subsea pipeline. The method comprises the steps of introducing into an isolated length of the conduit containing the paraffin a pre-determinable amount of an emulsified mixture of an aqueous solution and a hydrocarbon solution. The composition used in the method incorporates an aqueous solution which comprises in-situ nitrogen-generating components together with a sufficient amount of a buffered pH adjuster to produce a buffered pH value for the aqueous solution to abate the time of the reaction rate of the nitrogen-generating components to a level permitting introduction of the components into the isolated length prior to completion of any significant portion of the reaction required to effect temperature melting of the paraffin deposits. In a preferred form, a crystalline modifier may be incorporated into the hydrocarbon solution. After treatment, the solutions containing the dissolved paraffin are removed from the isolated conduit section. Further, the patent discloses that wherein the nitrogen-generating components comprise sodium nitrite in a concentration ranging from between about 3 to about 10 molar; and ammonium nitrate in a mole concentration approximately equal to that selected for the sodium nitrite.

A paper by J. P. Ashton et al., entitled "In Situ Heat System Stimulates Paraffinic Crude Producers in Gulf of Mexico," in SPE Production Engineering, May 1989, p. 157-160, describes the thermal stimulation of wells in order to remove the paraffinic damage through the heat generation caused by an exothermic chemical reaction, in aqueous phase, the temperature of the formed brine reaching up to 248° F. (120° C.). The reaction rate is controlled to generate pre-determined amounts of heat at a previously established well depth. The injection of hot brine in the producing formation creates a heated region around the well perforations. The radial extension of the heated region is a function of the injected heated brine volume. As heat is transferred through vertical conduction through the perforated interval, formation areas of low permeability are equally heated. The exothermic reaction employs sodium nitrite and ammonium nitrate in aqueous solution, the reaction products being nitrogen, water and sodium nitrate. The resulting brine is not considered to be deleterious to the formation. The reaction occurs as soon as the forming salts are mixed, in the presence of HCl as catalyst, the control of the reaction being done by buffering the pH of the solution in the range of from 5.0 to 8.0. The reaction is faster at a lower pH. Control is effected such that the reaction begins gradually and progresses slowly as the solution is displaced throughout the production string at constant rate. Nearly 61 meters above the perforations, the reaction rate increases and produces huge amounts of heat, the temperature reaching a thermal maximum, heat being lost to the environment, with consequent reduction in the temperature of the spent solution.

In U.S. Pat. No. 5,183,581 issued Feb. 2, 1993 to Carlos N. Khalil; Regis K. Romeu; Andre Rabinovitz, the abstract describes the disclosure as a process, based on the Nitrogen Generating System/Emulsion in the presence of organic solvents, which is useful for the dewaxing of producing formations. The heat generation with the nitrogen reaction system and organic solvents gives rise to a thermo-chemical, synergistic system for long lasting removal of paraffinic damage, oil production rates being restored and even increased. The patent more particularly describes a process for the dewaxing of producing formations by means of a water-in-oil nitrogen generating emulsion system, which comprises the steps of: (a) preparing an aqueous solution of $NH_4Cl$ having a concentration of from 4.0 to 6.0M; (b) preparing an aqueous solution of $NaNO_2$ having a concentration of from 5.0 to 9.0M; (c) preparing an organic solvent mixture to achieve the hot dissolution of the paraffinic damage; (d) adding an emulsifier to the organic solvents mixture so that the concentration of emulsifier in the mixture comprises between 0.5 to 2.0%; (e) adding acetic acid 96% to the $NH_4Cl$ solution; (f) adding 50% of the emulsified organic solvents mixture of step (d) to the $NH_4Cl$ and 50% of the mixture to the $NaNO_2$ solution obtaining thus a $NH_4Cl$ emulsion and a $NaNO_2$ emulsion respectively, both emulsions being kept under agitation; (g) pumping simultaneously into the well the $NH_4Cl$ and $NaNO_2$ emulsions, forming a mixture of equimolar $NH_4Cl$ and $NaNO_2$ amounts thus initiating an equimolar reaction between the components mixture, this mixture producing nitrogen and heat, while pH is kept between 4.5 and 5.8; and (h) after the pumping of the treating fluid, displacing it from the well by means of an overflush with an aqueous saline fluid.

In U.S. Pat. No. 5,484,488 issued Jan. 16, 1996 to Paul R. Hart and Michael J. Brown, the abstract describes the disclosure as methods for removing paraffin wax deposits from the surfaces of oilfield production equipment during oil production by melting and subsequently dispersing the deposits. These methods utilize an acid compound and a neutralizer compound which react exothermally to melt the deposit and form a dispersant to remove the melted fragments of the deposit.

In U.S. Pat. No. 5,639,313 issued Jun. 17, 1997 to Carlos Nagib Khalil, the abstract describes the disclosure as a process for the thermo-chemical dewaxing of a hydrocarbon transmission conduit, which comprises, after assessment of the conduit internal effective volume, treating the wax-containing conduit with a water-in-oil emulsion, co-currently to the production flow. The emulsion contains inorganic reactants which generate nitrogen and heat, which fluidize the paraffin deposit which is later driven off by cleaning beds. The amount of removed paraffin is known by assessing the final internal effective volume.

In a Ph.D. dissertation entitled Fused Chemical Reactions to Remediate Paraffin Plugging in Sub-Sea Pipelines by Duc Anh Nguyen, having for Advisor H. Scott Fogler, published in August 2004 by the University of Michigan, ISBN 0-496-69361-2, an abstract describes the work as a timed release scheme of the citric acid-catalyst was used to fuse the highly exothermic reaction between ammonium chloride and sodium nitrite in a fused chemical reaction (FCR) system. The timed release was obtained by encapsulating the acid-catalyst in gelatin capsules then coating the capsules with a water-soluble polymer. The highly exothermic FCR system is demonstrated to be a feasible solution for the billion-dollar problem of paraffin deposition during crude oil production and transportation operations in sub-sea pipelines. Studies of the exothermic reaction in an isothermal reactor showed that hydrogen ions catalyze the reaction by changing the concentration of the reacting species, not by changing the reaction pathways. The rate-limiting step involves the $S_N2$ reaction between aqueous molecular ammonia and nitrogen trioxide to form nitrosamine. The activation energy of the reaction was found to be about 65.7 kJ/mol experimentally, which compares very favorably (within 11%) with the value found from molecular modeling. The facilitated diffusion of hydrogen ions away from the polymer interface is the principal process that determines the rate limiting step as well as the overall rate of the polymer dissolution. The facilitated diffusion effect increases significantly with an initial increase in the carrier concentration, then approaches a limit at high carrier concentration. However, there are optimum values of the carrier's $pK_a$ and of the solution pH which give a maximum facilitation effect. A homogenous chemico-diffusion model can predict concentration profiles of all species across the diffusion boundary layer and polymer dissolution rates which agree well with experimental results. Good agreement between simulation and experimental results for the FCR system in both batch and flow conditions was achieved. Batch experiments showed that the heat release is controlled by the thickness of the polymeric coating and can be delayed as long as 20 hours. Flow experiments demonstrated that the FCR system could be controlled to provide a substantial amount of effective heat in-situ. This large amount of effective heat is sufficient to soften and melt the wax deposit. The model for the FCR system in flow conditions was also extended to apply in a typical sub-sea pipeline.

In U.S. Pat. No. 6,939,082 issued Sep. 6, 2005 to Benton F. Baugh, the abstract describes the disclosure as a method of taking a remotely operated vehicle to the ocean floor to land on and move along a subsea pipeline above or below the seafloor and repeatedly circulate seawater which has been heated electrically, mechanically, or chemically across the outer surface of the pipeline to melt hydrates or paraffins which have formed on the inside of the pipeline.

In European Application No. EP98300454 published Jan. 4, 2006 having for named inventors Celso Rodrigo De Souza and Carlos Nagib Khalil, filed Jan. 22, 1998 and entitled "Improved Method for the Thermo-Chemical Dewaxing of Large Dimension Lines, the independent claim is for a method for the thermo-chemical dewaxing of a hydrocarbon transmission conduit containing paraffin deposit, said method comprising the steps of: [sic] (b) maintaining said emulsion in said conduit under conditions sufficient to fluidize the paraffin deposit and to generate nitrogen gas and heat from the reaction of said oxidizing nitrogen salt and said reducing nitrogen salt; and (c) removing the fluidized paraffin deposit from said conduit, wherein the delayed action activator is a linear, aliphatic copolyanhydride solubilized in a polar organic solvent.

As demonstrated by these published efforts to remediate paraffin wax deposits in hydrocarbon-bearing formations or in conduits for the production or transmission of hydrocarbon, there continues to be a long-felt need to find a solution for this problem.

SUMMARY OF THE INVENTION

According to one aspect of the invention, a method is provided for increasing the temperature of a section of conduit used for the production or transmission of hydrocarbon. The method comprises the step of: forming a treatment fluid comprising: (i) a carrier fluid; and (ii) a first reactant and a second reactant. The first reactant and second reactant are selected for being capable of reacting together in an exothermic chemical reaction; and the first and second reactant are in at least sufficient concentrations in the carrier fluid to generate a theoretical heat of reaction of at least 1,000 kJ/liter of the treatment fluid. At least some of at least one of the first reactant and the second reactant is suspended in the carrier fluid in a solid form that is adapted to help control the release of the reactant into the carrier fluid. The method further comprises the step of: introducing the treatment fluid into a section of conduit used for the production or transmission of hydrocarbon.

According to another aspect of the invention, a method is provided for increasing the temperature of a section of conduit used for the production or transmission of hydrocarbon, the method comprising the steps of: forming a treatment fluid comprising: (i) a carrier fluid; (ii) a first reactant and a second reactant, wherein the first reactant and second reactant are selected for being capable of reacting together in an exothermic chemical reaction; the first and second reactant are in at least sufficient concentrations in the carrier fluid to generate a theoretical heat of reaction of at least 1,000 kJ/liter of the treatment fluid; and (iii) a catalyst for the reaction between the first reactant and the second reactant, wherein at least some of the catalyst is suspended in the carrier fluid in a solid form that is adapted to help control the release of the catalyst into the carrier fluid. The method further comprises the step of: introducing the treatment fluid into a section of conduit used for the production or transmission of hydrocarbon.

After introducing the treatment fluid into the conduit, the treatment fluid is preferably allowed to heat the conduit to help melt the paraffin wax deposits. The treatment fluid preferably includes a liquid hydrocarbon that is a liquid at standard temperature and pressure, which can help dissolve and remove the paraffin wax. The treatment fluid can then be displaced from the section of conduit and help remove the paraffin wax from the section of conduit.

According to another aspect of the invention, a method is provided for controlling the release of at least one reactant of an exothermic reaction into a carrier fluid. The method comprises the steps of: (a) mixing a reactant with a polymeric material, wherein the polymeric material is capable of being hydrated, and water, wherein the proportion of water is insufficient to substantially hydrate the polymeric material but is sufficient to make the polymeric material sticky to help bind the reactant into a matrix; and (b) drying the mixture. The method preferably further comprises the step of: forming the mixture into pellets.

According to yet another aspect of the invention, a method is provided for controlling the release of a catalyst of an exothermic reaction into a carrier fluid, the method comprising the steps of: (a) mixing the catalyst of an exothermic reaction with a polymeric material, wherein the polymeric material is capable of being hydrated, and water, wherein the proportion of water is insufficient to substantially hydrate the polymeric material but is sufficient to make the polymeric material sticky to help bind the catalyst into a matrix; and (b) drying the mixture. The method preferably further comprises the step of: forming the mixture into pellets.

According to yet another method of making a solid material for controlling the release of a at least one reactant for an exothermic reaction into a carrier fluid, the method comprising the steps of: (a) mixing a reactant with a binding material; and (b) forming the mixture into pellets. A similar method can be used for helping to control the release of a catalyst for an exothermic reaction into a carrier fluid.

As used herein, a solid means and refers to a form of material that is at least initially not dissolved in a fluid. The solid is preferably in the form particulate or small pellets that can be dispersed and suspended in a carrier fluid. The solid can be encapsulated in a solid form. The carrier fluid can have a viscosifier to help suspend the solid form of the reactant or containing the reactant.

The solid form of a reactant or comprising a reactant can be, for example, a pure solid, undissolved form of the reactant, a solid matrix of material with the reactant embedded in the matrix, a solid encapsulation of a liquid or solid material with the reactant therein, or any combination in any proportion of any one or more of the foregoing. The solid form is adapted to help control the initial release of the reagent into solution and/or the rate of release of the reagent into solution. This helps control the initiation and/or the rate of reaction between the reactants, respectively, which helps control when the heat of reaction is released. As described in the detailed description of the invention, several different examples of techniques are provided for having at least one of the reactants in a solid form, which are adapted to control the mixing of the reactants in a carrier fluid and the generation of the heat of reaction.

These aspects of the invention can be practiced independently or together. Thus, the techniques can be used to stage the exothermic reaction, and thereby stage the release of heat energy over time.

It is also possible to use the methods according to the invention to delay the initiation of the exothermic reaction, and thereby delay the initiation of release of heat energy. This can be used, for example, to allow time for the treatment fluid to reach a desired portion of a conduit that may have paraffin deposits.

These and other objects, advantages, and aspects of the invention will be apparent to a person of skill in the art upon reading the detailed description of preferred embodiments and consideration of the drawing.

BRIEF DESCRIPTION OF THE DRAWING

The accompanying drawings are incorporated into and form a part of the specification to illustrate several examples of the present inventions. These drawings together with the description serve to explain the principles of the inventions. The drawings are only for illustrating preferred and alternative examples of how the inventions can be made and used and are not to be construed as limiting the inventions to the illustrated and described examples. The various advantages and features of the present inventions will be apparent from a consideration of the drawings in which.

DETAILED DESCRIPTION OF PREFERRED EMBODIMENTS

Figure 1:
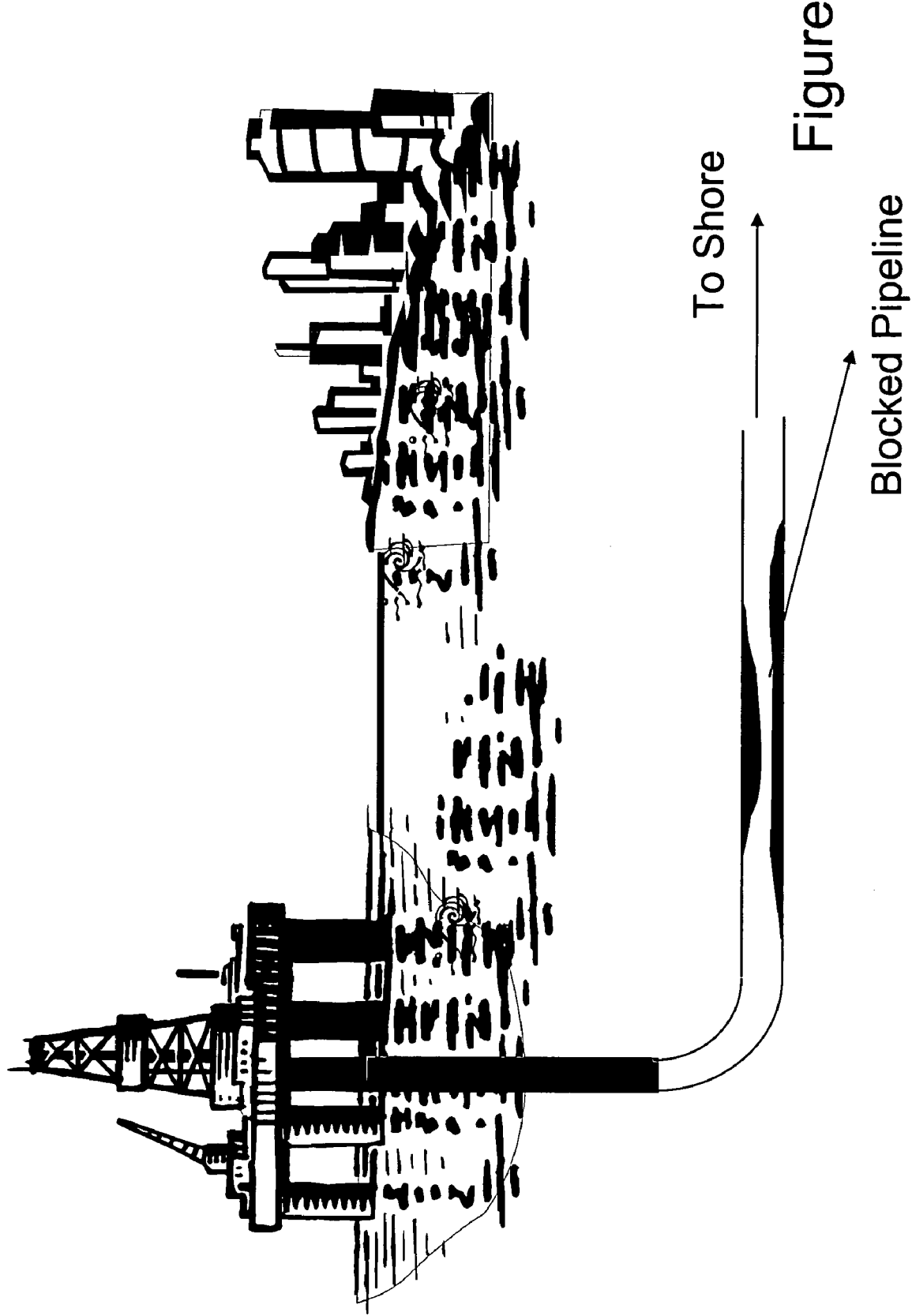
FIG. 1 is a simplified schematic of an offshore platform for oil production having a pipeline to the shore that is partially blocked by paraffin wax deposits.

The invention provides for new methods for controlling an exothermic reaction in a treatment fluid, which can be used to facilitate the dissolution and cleanup of paraffin wax buildup in conduits used for hydrocarbon production or transmission. This paraffin deposition leads to reduced crude oil flow and under extreme conditions leads to complete blockage of the pipelines, as previously discussed and as illustrated in FIG. 1.

"Wax" is a low-melting organic mixture or compound of relatively high molecular weight, solid at room temperature and generally similar in composition to fats and oils except that it contains no glycerides. Some are hydrocarbons; others are esters of fatty acids and alcohols. They are classed among the lipids. Waxes are thermoplastic, but since they are not high polymers, are not considered in the family of plastics. Common properties are water repellency, smooth texture, low toxicity, freedom from objectionable odor and color. They are combustible and have good dielectric properties; soluble in most organic solvents; insoluble in water. A major type of wax is paraffin wax. Hawley's Condensed Chemical Dictionary, 14th Edition, Ed. Richard J. Lewis, 2001, p. 1174.

"Paraffin," in a broad sense, is also known as alkane, a class of aliphatic hydrocarbons characterized by a straight or branched carbon chain; generic formula $C_nH_{2n+2}$. Their physical form varies with increasing molecular weight from gases (methane) to waxy solids. In a narrower sense, "paraffin" refers to paraffin wax. Hawley's Condensed Chemical Dictionary, 14th Edition, Ed. Richard J. Lewis, 2001, p. 835.

"Paraffin wax" has the properties of being a white, translucent solid; tasteless; odorless; combustible; consisting of a mixture of solid hydrocarbons of high molecular weight, e.g., $C_{36}H_{74}$. Paraffin wax has density of 0.880-0.915, melting point 116-149° F. (47-65° C.), flash point 390° F. (198° C.), auto-ignition temperature 473° F. (245° C.). Paraffin wax is soluble in benzene, ligroin, warm alcohol, chloroform, turpentine, carbon disulfide, and olive oil; insoluble in water and acids. Hawley's Condensed Chemical Dictionary, 14th Edition, Ed. Richard J. Lewis, 2001, p. 835.

As used herein, the solubility of a substance is its concentration in a saturated solution. A substance having a solubility of less than 1 g/100 mL of solvent is usually considered insoluble. The solubility is sometimes called "equilibrium solubility" because the rates at which solute dissolves and is deposited out of solution are equal at this concentration.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more reactants. It is to be understood that the words "first" and "second" serve no other purpose and are not part of the name or description of the reactant. Furthermore, it is to be understood that that the mere use of the term "first" and "second" does not require that there be any "third" or further reactant, although that possibility is contemplated under the scope of the present invention.

The methods according to the present invention will be described by referring to and showing various examples of how the invention can be made and used.

Preferably, the process will: (a) be delayed in starting to produce heat until after a sufficient time to deliver the treatment fluid to a section of a conduit to be treated, which may have paraffin buildup or be substantially blocked by paraffin; and (b) heat the section of conduit for at least about 2 hours and preferably for about 3-5 hours, thereby having enough time to impart the heat to the paraffin and cause it to at least soften, and preferably melt.

According to the presently most preferred embodiment of the invention, the preferred exothermic reaction is an acid catalyzed reaction between ammonium chloride and sodium nitrite, as shown in the following reaction (Equation 1):

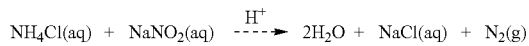

(Eq. 1)

$$NH_4Cl(aq) + NaNO_2(aq) \xrightarrow{H^+} 2H_2O + NaCl(aq) + N_2(g)$$

The theoretical heat of reaction for the reaction shown in Equation 1 is −334.47 kJ/mol. It is expected that preferred concentrations would be 5-8 Molar in water of each of the reactants with an acid (e.g., acetic acid or citric acid) concentration of about 3% by weight. For these reactants at this concentration, the theoretical heat energy that can be generated can be calculated as follows: (−335 kJ/mole)×(5 moles/liter)=−1670 kJ/liter. The temperature in these conditions starting at standard temperature and pressure is expected to go up to about 200° F. (93° C.). However, this chemical reaction is known to proceed at a high rate, which has been difficult to control.

It is believed that the majority of the heat of this reaction between ammonium chloride and sodium nitrite is due to the reaction between the nitrite and ammonium ions. Thus, it is believed that other ammonium salts and other nitrite salts would be useful for an exothermic reaction. Ammonium chloride and sodium nitrite, however, are the presently most preferred reactants.

According to one aspect of the present invention, the objective is to have at least one of the reactants in a solid form to help control this exothermic reaction so that the heat of reaction energy is released over a period of time instead of as an energy spike. It should be noted that the control of the mixing of the reactants is not expected to substantially affect the total amount of heat that is generated. There are several examples of different types of solid materials that can be employed.

According to one embodiment of the invention, at least one of the reactants can be embedded in a solid matrix comprising a material that helps delay the release of the reactant. The slow release of a reactant can provide a controlled reaction for heat generation.

Figure 2:
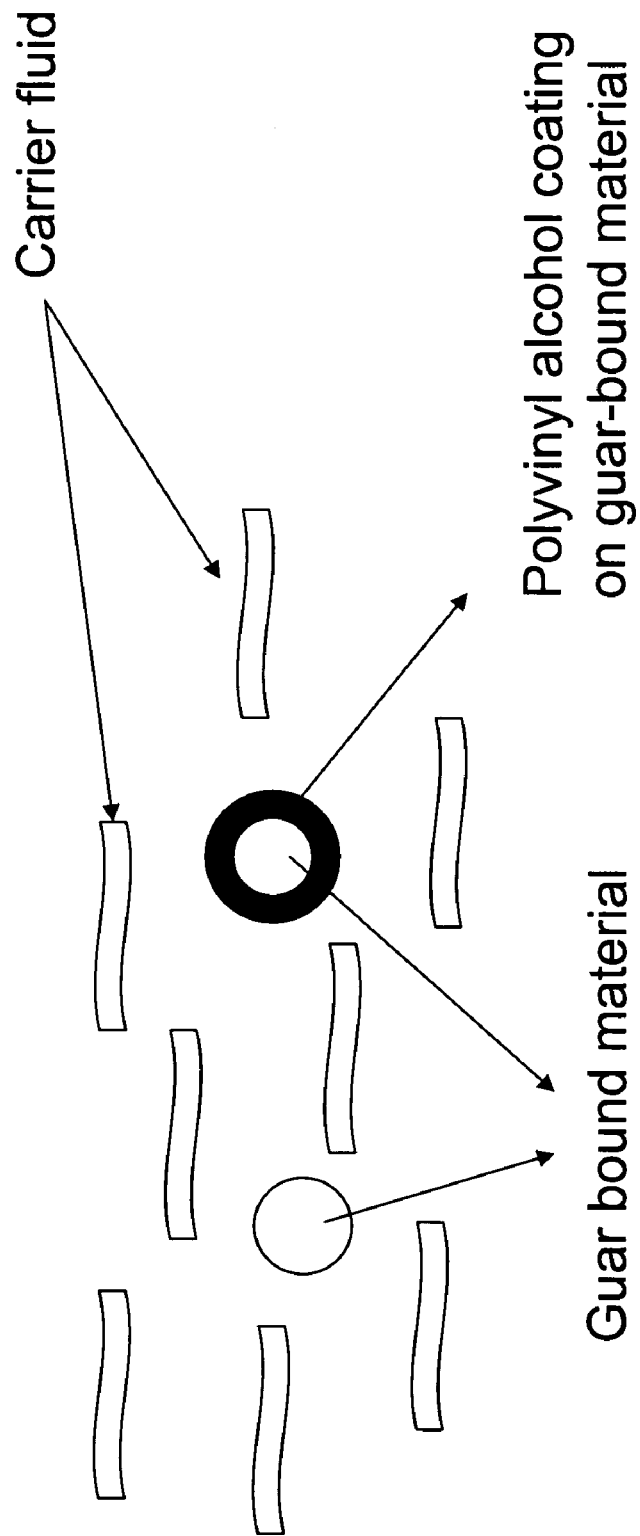
FIG. 2 is a graphical representation of a guar-bound reactant, which can be generally spherical, other shaped, or an irregular-shaped pellet, and a guar-bound reagent that also has a polyvinyl alcohol coating which dissolves in water at about 120-150° F. (49-65° C.), which can be used together in a carrier fluid to stage the release of one or more reactants.

According to another embodiment of the invention, at least one of the reactants can be encapsulated with an encapsulating material to form a solid capsule for the reactant. Again, the slow release of a reactant can provide a controlled reaction for heat generation According to still another embodiment of the invention, embedding at least one of the reactants in a solid matrix can be further combined with encapsulation of at least some of the reactant that is embedded in a solid matrix to provide additional control over the exothermic reaction. According to this embodiment, FIG. 2 is a graphical representation of a guar-bound reactant, which can be generally spherical, other shaped, or an irregular-shaped pellet, and a similar guar-bound material that also has a polyvinyl alcohol coating which dissolves in water at about 120-150° F. (49-65° C.), which can be used together in a carrier fluid to stage the release of one or more reactants.

A solid guar-bound reactant can be formed, for example, by mixing about 95% by weight of a reactant, 4% by weight dried guar gum powder, and about 1% by weight water. Preferably the substantially pure reactant is naturally in a solid form at standard temperature and pressure, e.g., sodium nitrite. Guar is a polymeric material that can be hydrated. The amount of water is insufficient to substantially hydrate the guar powder, but is sufficient to make the polymeric material sticky to help bind the reactant into a matrix. The materials can be mixed together into a solid matrix, which can then be formed into small pellets. These pellets are subsequently dried in a vacuum oven at about 80° C. for about 12 hours to substantially reduce the moisture content and to obtain the final product. In addition to acting as a binder, the guar-bound dry matrix also acts as a vehicle for a slow release of the reactant salt into solution. The size of these pellets can be varied as desired. Preferably, the pellets vary in size from about 1 to about 10 mm across.

According to another and further example according to the invention, as shown in FIG. 2, some or all of the solid guar-bound reactant can optionally be coated or encapsulated with a material to delay the release of at least some of a guar-bound reactant, which can be used to help stage or incrementally mix the reactants to control the release of the heat of reaction.

According to yet another example, pellets of a material comprising a solid reactant, by itself or in a solid matrix, can be encapsulated to control the release of the reactant. For example, the encapsulating material can be slowly dissolvable in one of the components of the carrier fluid, or sensitive to a change in pH of an aqueous environment, or sensitive to an increase in temperature.

As an example of a material that can be used for encapsulating a reactant that is slowly dissolvable, chitosan can be used as a coating or encapsulating material. Chitosan dissolves in acetic acid which is a catalyst for the reaction. The chitosan coated material can be suspended in a viscosified acetic acid solution. The time taken by the chitosan to dissolve in an acetic acid solution would achieve delay in initiating the reaction.

As an example of a material that can be used for encapsulating a reactant that is sensitive to an increase in temperature, examples include polyvinyl alcohol or hydrogenated vegetable oil.

Any of one or more of these various techniques can be used, separately or together, to help control the release of a reactant.

Figure 3:
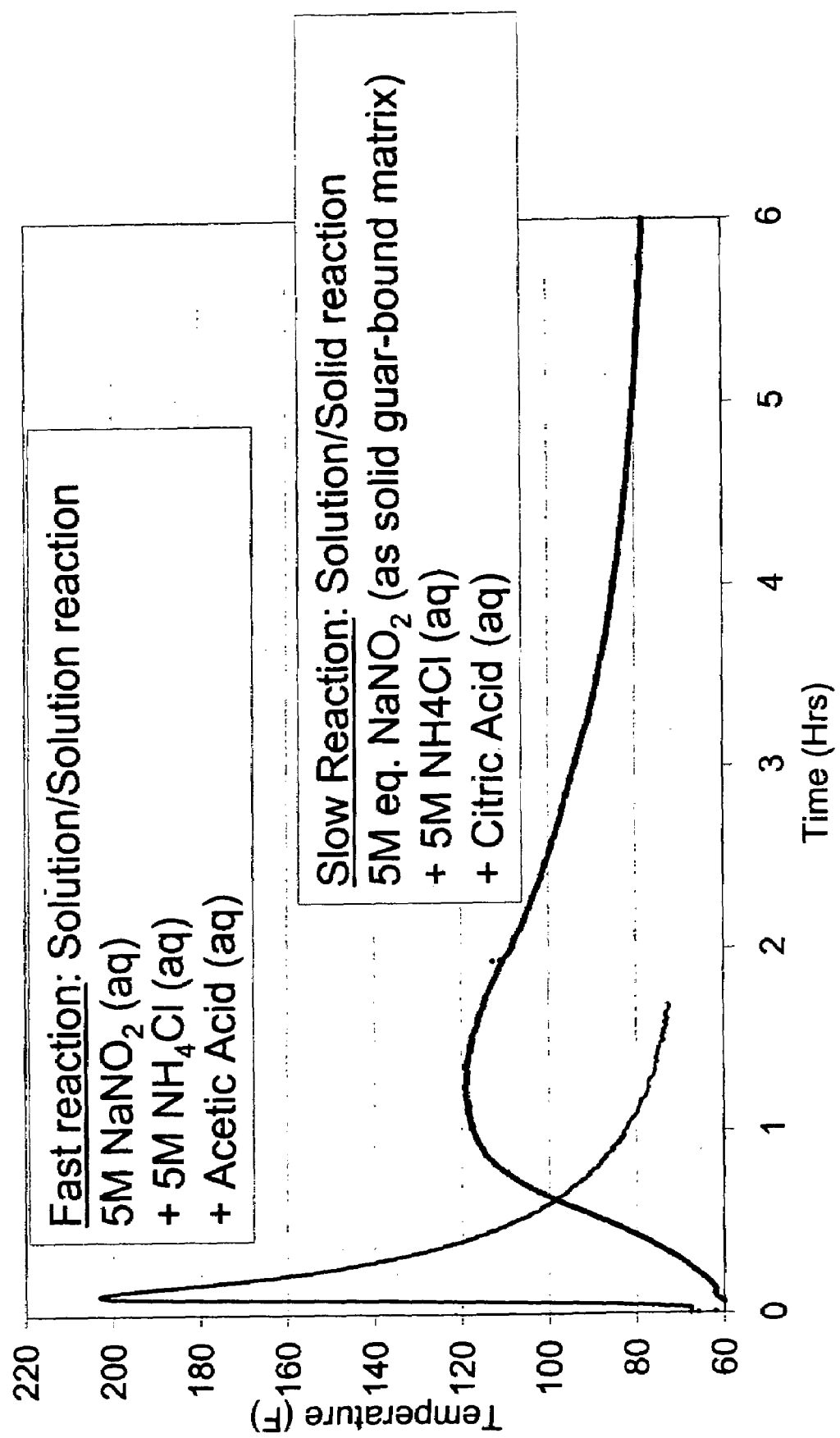
FIG. 3 is a graph showing the control in heat generation that can be achieved where a sample with one of the reactants in a solid form as a guar-bound $NaNO_2$ matrix that controls the release of nitrite ions over time for reaction with ammonium ions already dissolved in the solution.

FIG. 3 is a graph showing the control in heat generation that can be achieved where a sample with one of the reactants in a solid form as a guar-bound $NaNO_2$ matrix that controls the release of nitrite ions over time for reaction with ammonium ions already dissolved in the solution. In FIG. 3, a first line shows the change in temperature over time for an uncontrolled or fast reaction of aqueous solution phase reactions of 5M $NH_4Cl$ with 5M $NaNO_2$ in the presence of acetic acid. A second line shows the change in temperature over time for a controlled or slow reaction of an aqueous solution of $NH_4Cl$ with guar-bound $NaNO_2$ in the presence of acetic acid.

Figure 4:
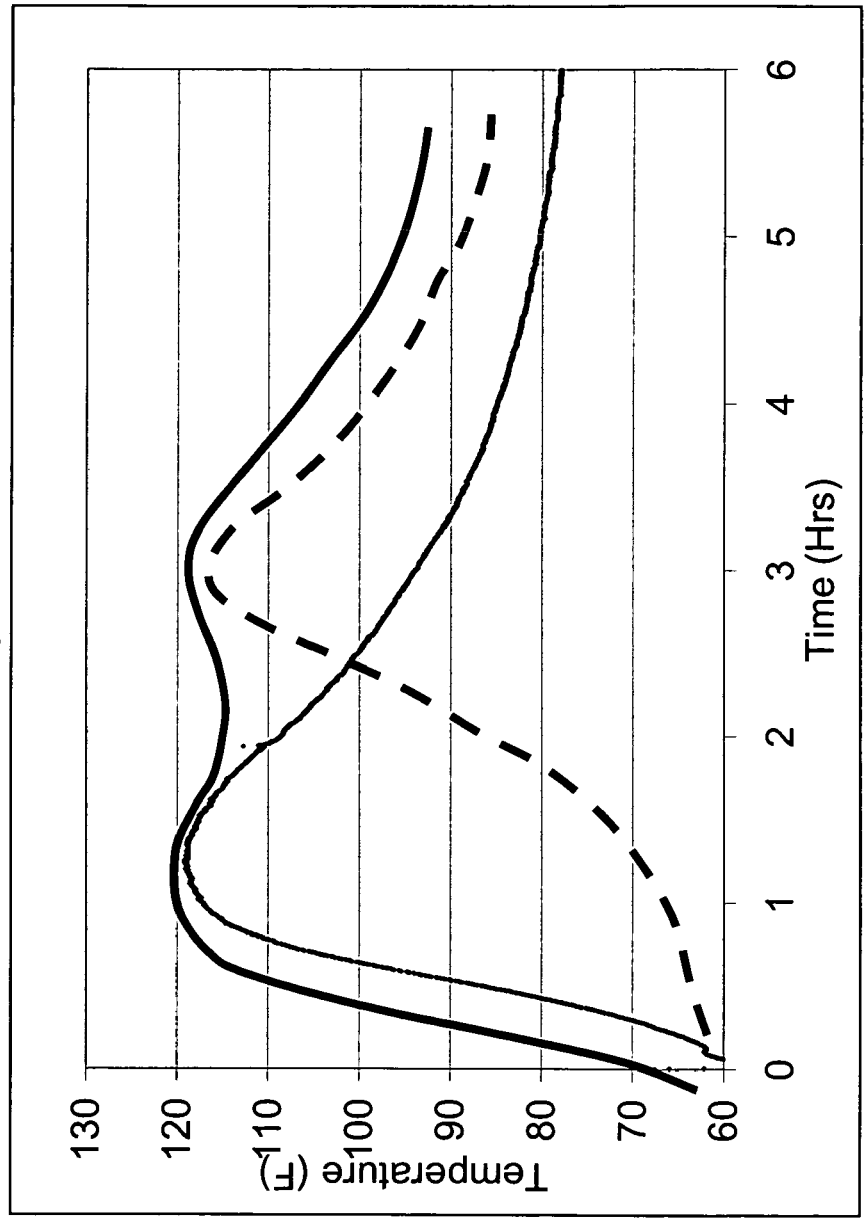
FIG. 4 is a theoretical graph showing the expected increase in temperature (° F.) over time (hours) for a staged release of solid sodium nitrite into an aqueous solution for the exothermic ammonium chloride and sodium nitrite reaction, where a first line having a single temperature peak at about 1 hour represents the increase in temperature due to the release of the guar-bound reactant, a second dashed line having a single temperature peak at about 3 hours represents the subsequent temperature triggered release of a guar-bound reactant that is coated with polyvinyl alcohol ("PVA"), and a third line having two temperature peaks at about 1 hour and about 3 hours represents the overall temperature of the solution.

FIG. 4 is a conceptual graph showing an expected combined temperature profile (° F.) over time (hours) for a staged release of solid sodium nitrite into an aqueous solution for the exothermic ammonium chloride and sodium nitrite reaction, where a first line represents the increase in temperature due to the release of the guar-bound reactant, a second line represents the subsequent temperature triggered release of a guar-bound reactant that is coated with polyvinyl alcohol ("PVA"), and a third line represents the overall temperature of the solution.

Figure 5:
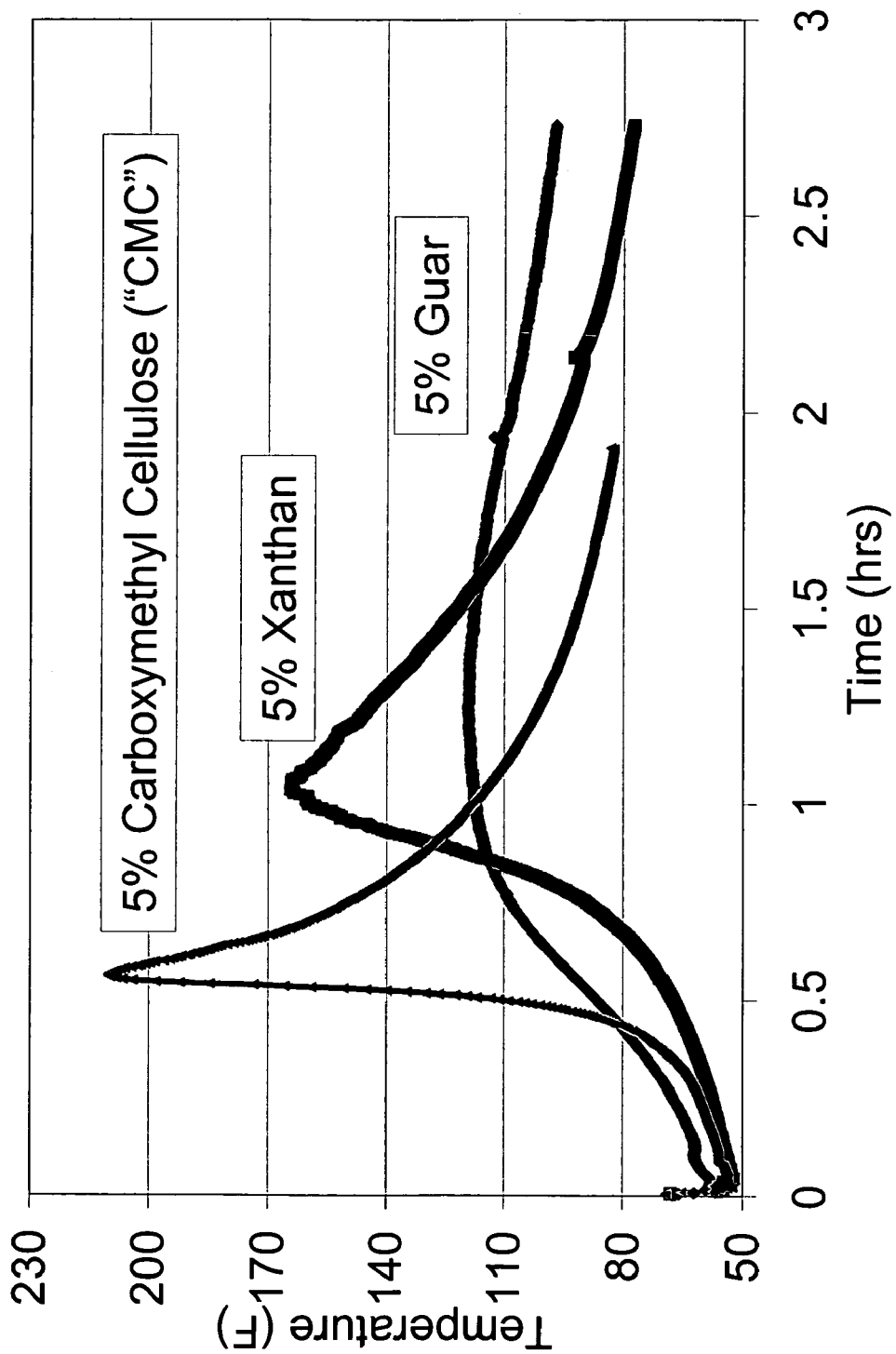
FIG. 5 is a graph showing a comparison of guar, xanthan, and carboxymethyl cellulose ("CMC") as binding materials for controlling the release of one of the reactants in a solid form as a guar-bound, xanthan-bound, or CMC-bound $NaNO_2$ matrix that controls the release of nitrite ions over time for reaction with ammonium ions already dissolved in the solution.

FIG. 5 is a graph showing a comparison of guar, xanthan, and carboxymethyl cellulose ("CMC") as binding materials for controlling the release of one of the reactants in a solid form as a guar-bound, xanthan-bound, or CMC-bound $NaNO_2$ matrix that controls the release of nitrite ions over time for reaction with ammonium ions already dissolved in the solution. As shown in FIG. 4, 5% by weight of the binder material was tested to control the release of solid form $NaNO_2$ into an aqueous solution of $NH_4Cl$ in the presence of acetic acid. While each of these materials to some degree controlled the release of the solid form $NaNO_2$ into an aqueous solution, the guar appears to provide the slowest release of the three tested materials with an incomplete release, i.e., residual lumps at the end of the test period. The xanthan as binder material provided a more complete release of the solid form $NaNO_2$ into an aqueous solution for reaction with the dissolved $NH_4Cl$ in the presence of acetic acid. Finally, the CMC as a binder material delayed the release of the solid form $NaNO_2$ into an aqueous solution but did not greatly control or slow the release. It is expected that each of these binder materials, or a combination of two or more of such materials, is expected to be useful for helping to control the release of a solid form reactant into an aqueous solution for the purposes of the present invention. Guar is presently the most preferred binder material.

Figure 6:
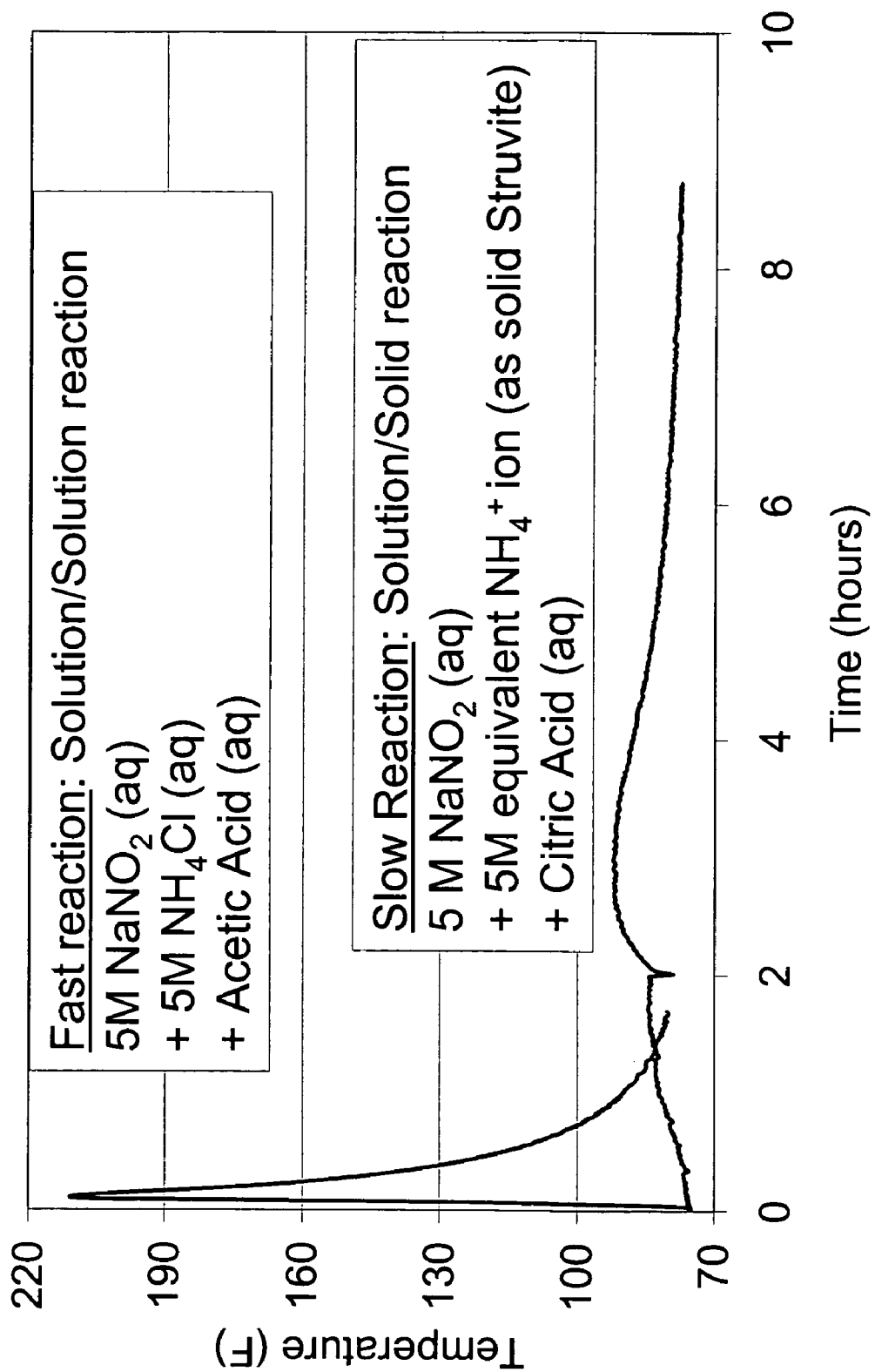
FIG. 6 is a graph showing the control in heat generation that can be achieved with one of the reactants in the form of solid, undissolved struvite with a chelating agent to help slowly dissolve the struvite and thereby release ammonium ions for reaction with $NaNO_2$ already dissolved in the solution.

According to yet another embodiment of the invention, undissolved solid struvite is used in place of ammonium chloride in the reaction shown above in Equation 1. Struvite is a magnesium ammonium phosphate and acts as a source of ammonium ions. Magnesium ammonium phosphate ($MgNH_4PO_4*0.6H_2O$) is a white powder, density 1.71, melting point (decomposes to magnesium pyrophosphate, $Mg_2P_2O_7$), soluble in acids, insoluble in alcohol and water. Hawley's Condensed Chemical Dictionary, $14^{th}$ Edition, Ed. Richard J. Lewis, 2001, p. 237. As struvite is known to be insoluble in water, however, but soluble in acidic solutions and the dissolution of struvite is also known to be enhanced by the presence chelating agents (e.g., citric acid, sodium salts of ethylenediamine tetraacetic acid ("EDTA")), which bind onto magnesium thereby breaking the solid matrix. By controlling the concentration of the chelating agent, it is possible to control the dissolution of struvite and hence to control the rate of heat generation. FIG. 6 is a graph showing the control in heat generation that can be achieved with one of the reactants in the form of solid, undissolved struvite and a chelating agent to slowly dissolve the struvite and thereby release ammonium ions for reaction with $NaNO_2$ already dissolved in the solution.

Figure 7:
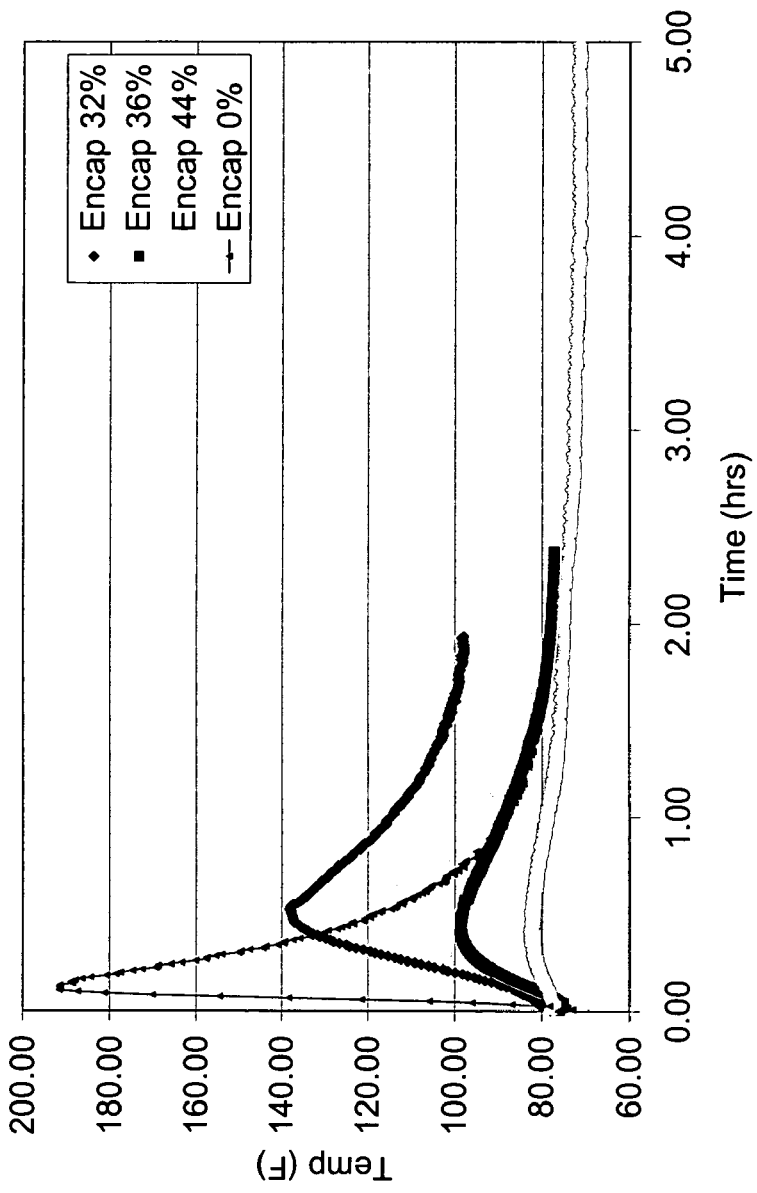
FIG. 7 is a graph showing the control in heat generation that can be achieved where ammonium chloride is first impregnated on diatomaceous earth and subsequently coated with a resin-based slow release agent that controls the release of ammonium ions over time for reaction with nitrite ions already dissolved in the solution.

According to yet another embodiment of the invention, the $NH_4Cl$ is bound into a solid form. More particularly, in this embodiment the $NH_4Cl$ is impregnated on diatomaceous earth and subsequently coated with a resin-based slow release agent. The particle size was 20-40 mesh. FIG. 7 is a graph showing the control in the release of ammonium ions over time for reaction with nitrite ions already dissolved in a test solution in the presence of acetic acid, which helps control the timing and rate of heat generation. In FIG. 7, a first line plotted on the graph shows the change in temperature over time for an uncontrolled or fast reaction of aqueous solution phase reactions of 5M $NH_4Cl$ with 5M $NaNO_2$ in the presence of acetic acid reaching a maximum temperature of about 190° F. A second line shows the change in temperature over time for a controlled or slow reaction of a 32% by weight encapsulation of $NH_4Cl$ with aqueous dissolved $NaNO_2$ in the presence of acetic acid reaching a maximum temperature of about 140° F. A third line shows the change in temperature with a 36% by weight encapsulation of $NH_4Cl$ reaching a maximum temperature of about 100° F., and a fourth line shows the change in temperature with a 44% by weight encapsulation of $NH_4Cl$ reaching a maximum temperature of about 80° F.

Figure 8:
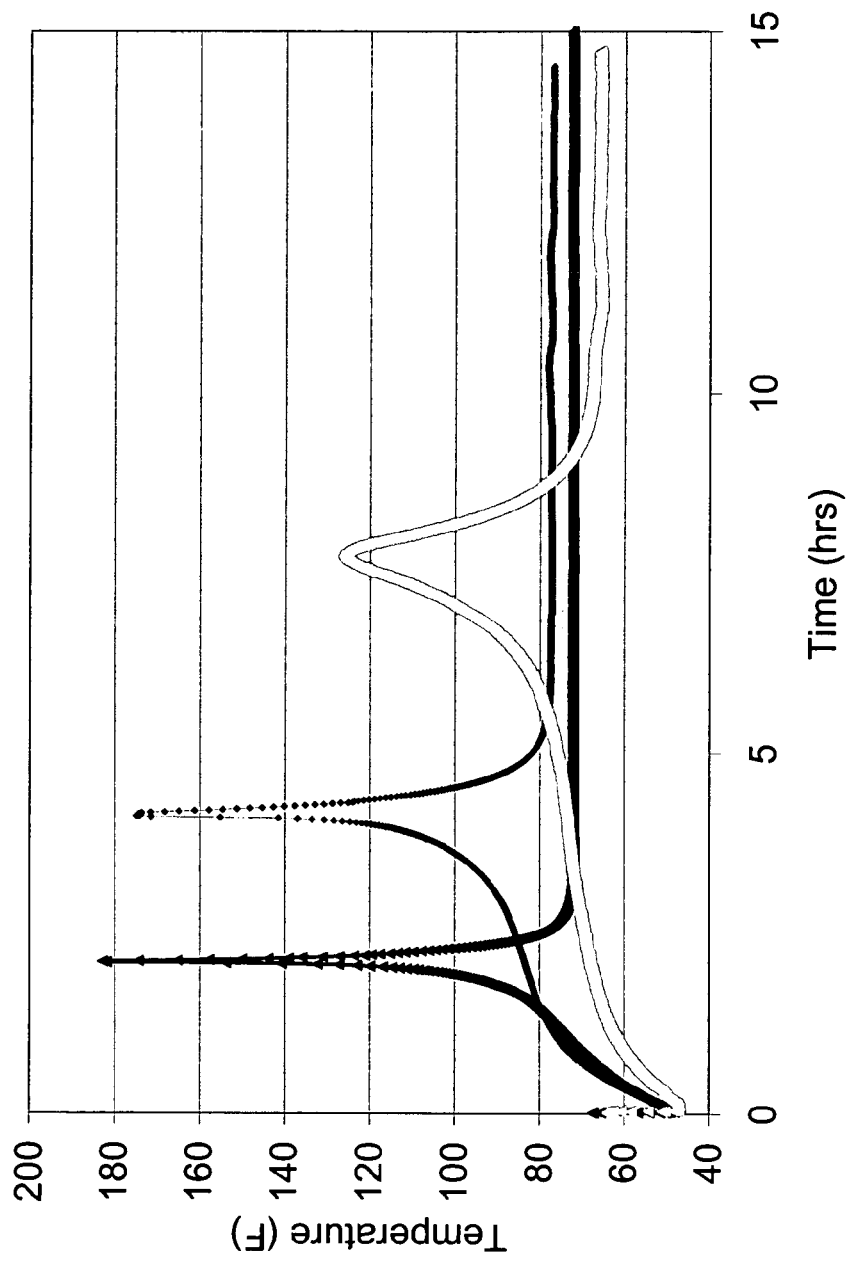
FIG. 8 is a graph of a delayed exothermic reaction process wherein an exothermic reaction is delayed before it begins by a delayed release acid system but the subsequent reaction is not otherwise controlled.

FIG. 8 is a graph of a delayed exothermic reaction process wherein an exothermic reaction is delayed before it begins by a delayed release acid system. One example of a technique that can be used to delay the reaction includes using a neutral or alkaline solution and delaying the release of an acid. Another example of a technique for delaying the start of includes encapsulating one or both of the reagents for an exothermic reaction to delay the initial release of the reagent or reagents.

The exothermic reaction according to Eq. 1 also produces nitrogen gas. When a viscosified fluid is used to carry the reactants, the generated nitrogen gas can produce a foamed fluid. It is believed that the foamed fluid can help provide a margin for safety in controlling the release of pressure generated by the nitrogen gas.

In addition to the above-described strategies for controlling the release of heat energy to help melt paraffin deposits, a non-ionic surfactant in the treatment fluid would be made to go past its cloud point due to the generation of heat. Above the cloud point, a surfactant would tend to penetrate the paraffin deposits. When the temperature comes down to ambient conditions, the surfactant would want to go back to solution, thereby pulling the paraffin molecules with them. Thus, this detergent like effect due to the heating with a non-ionic surfactant is expected to add considerable synergy to the paraffin wax removal methods. The choice of surfactants would vary on a case to case basis. The right surfactant would be expected to have a cloud point at least 10-15 degrees above the ambient temperature.

According to the invention, a method is provided for increasing the temperature of a section of conduit used for the production or transmission of hydrocarbon, the method comprising the steps of: (a) forming a treatment fluid comprising: a carrier fluid; and a first reactant and a second reactant, wherein: the first reactant and second reactant are selected for being capable of reacting together in an exothermic chemical reaction; the first and second reactant are in at least sufficient concentrations in the carrier fluid to generate a theoretical heat of reaction of at least 1,000 kJ/liter of the treatment fluid; and at least some of at least one of the first reactant and the second reactant is suspended in a solid form in the carrier fluid; and (b) introducing the treatment fluid into a section of conduit used for the production or transmission of hydrocarbon.

More preferably, the reactants and concentrations are selected to generate a theoretical heat of reaction of at least 1,500 kJ/ of the treatment fluid.

Preferably, the solid form is further adapted to help control the mixing between the first reactant and the second reactant. More preferably, the solid form is adapted to help control the mixing so that: (a) less than 50% of the total heat of the reaction is generated within any 1 hour period; and (b) greater than 50% of the total heat of the reaction is generated within a period of at most 6 hours. The purpose is to have the heat of reaction releases, whether at an even rate or in stages, so that a major spike in the release of heat energy is avoided, but that substantially all of the heat energy is released within a matter of hours. Most preferably, the heat of reaction is released over a period of about 3 to about 5 hours. For example, the solid form can comprise at least two different solid forms adapted to help control the mixing between the first reactant and the second reactant in at least two stages.

To control the rate of mixing and to help suspend the solid material in the carrier fluid, the solid form preferably substantially comprises particulate material. More preferably, the solid material is of a 20-40 mesh size.

The carrier fluid preferably comprises a viscosifying agent. The viscosifying agent helps suspend solid material in the carrier fluid. For example, the viscosifying agent can comprise: a water-soluble polymeric material. More preferably, the viscosifying agent may be a polysaccharide selected from the group consisting of: guar, hydroxylalkylguar, carboxyalkylhydroxyalkylguar, carboxyalkylcellulose, carboxyalkylhydroxyalkyl-cellulose, xanthan, derivatives of any of the foregoing, and any combination thereof in any proportion. The viscosifying agent can further comprise a crosslinking agent. Moreover, the treatment fluid can further comprise a breaker for the viscosifying agent.

Most preferably, the viscosifying agent comprises: a xanthan with additives that help the viscosifying agent withstand high salt content in the carrier fluid and an acidic pH of the type disclosed in US Patent Publication No. 2004/0214728, published Oct. 28, 2004, having for named inventors Robert S. Taylor, Gary P. Funkhouser, Michael A. McCabe, and B. Raghava Reddy, which is incorporated herein by reference in its entirety.

Depending on the reagents selected to generate heat, which may require an aqueous solution to react, the carrier fluid preferably comprises water. The water can be selected from the group consisting of: seawater; brackish water; freshwater; and any combination thereof in any proportion. The carrier fluid preferably comprises a hydrocarbon that is a liquid at standard temperature and pressure ("STP"), which can help dissolve paraffin wax. More preferably, depending on the reagents selected to generate heat, which may require an aqueous solution, the carrier fluid is an emulsion of water and hydrocarbon. Most preferably, the hydrocarbon in the carrier fluid is selected from the group consisting of: crude oil, kerosene, an aromatic solvent, and any combination thereof in any proportion. These are selected for their ability to dissolve paraffin wax.

Preferably, the treatment fluid further comprises a crystalline modifier to help dissolve the paraffin wax. The crystalline modifier can help dissolve or break up the deposited paraffin wax and it can help prevent dissolved or melted paraffin wax from redepositing elsewhere.

In addition for being selected for their high heat of reaction, the first reactant and the second reactant, and any catalyst, are preferably further selected for not having any detrimental effect on the pipeline.

Further, the first reactant and the second reactant are also preferably selected for having a relatively low activation energy of reaction.

In addition, the treatment fluid is preferably formulated such that it does not set or solidify, whereby the treatment fluid cannot itself inadvertently plug the conduit.

More particularly, at least one of the first reactant and the second reactant preferably is a water-soluble material. More preferably, both the first reactant and the second reactant each comprise a water-soluble material.

When both the first reactant and the second reactant comprise water soluble materials, preferably the first reactant comprises: a source of cations, and the second reactant comprises a source of anions. More preferably, the source of cations comprises: a source of ammonium ions; and the source of anions comprises: a source of nitrite ions. The source of ammonium ions preferably comprises an ammonium halide, and most preferably the ammonium halide comprises an ammonium chloride. Ammonium Sulfate and Ammonium Nitrate could also be used. But Ammonium Nitrate is less preferable because of its explosive nature. And preferably, the source of nitrite ions comprises: an alkali nitrite, and most preferably, the source of nitrite ions comprises: sodium nitrite.

Depending on the selection of the first reactant and the second reactant, the reaction may be assisted by or require a catalyst for an exothermic chemical reaction between the first reactant and the second reactant. When helpful or necessary, the step of forming a treatment fluid preferably further comprises: forming a treatment fluid further comprising a catalyst for an exothermic chemical reaction between the first reactant and the second reactant.

In the case of a reaction requiring a catalyst, the method advantageously can further comprise the step of: delaying the release of the catalyst to help delay the beginning of any substantial reaction between the first reactant and the second reactant. This step of delaying the release of the catalyst can be an independent and additional approach to controlling the beginning of the release of the heat of reaction, whereas having at least some of one of the first and second reactants in a solid form is a separate and independent approach to controlling when the heat of reaction is released after the release of a catalyst allows the start of the reaction. For example, the release of the catalyst may occur after some of one of the reactants has been released from its solid form to become available for reaction, such that a small initial spike in heat energy is allowed followed by a more sustained or stepped release of heat energy depending on the nature of the solid form of one or both of the reactants.

The encapsulating or embedding material for delaying the release of acid can be any material that melts or dissolve in the carrier fluid upon reaching a certain temperature to release the acid. Further, the dissolution of the polymeric material would be expected to increase with increasing temperature.

By way of example, the polymeric material can be a material that releases the encapsulated reactant upon reaching or exceeding a specific temperature. In such case, for example, the polymeric material can be selected to release a reactant at or above a temperature of 120° F. (49° C.), for example, polyvinyl alcohol. Or a polymeric material can be selected that releases the encapsulated reactant at a temperature above 150° F. (65° C.). Examples of encapsulating materials that have low melting points in these ranges also include vegetable oil based encapsulating materials, such as those described in U.S. Pat. No. 6,153,236 issued Nov. 28, 2000 to Balchem Corporation.

More particularly, for example, when the first and second reactants are ammonium ion and nitrite ion, the catalyst is preferably an acid, and more preferably a carboxylic acid. Most preferably, the acid is selected from the group comprising: acetic acid, citric acid, lactic acid, and any combination thereof in any proportion. For this particular reaction, the acid should be effective to make the pH of the water in the carrier fluid less than or equal to about 5.5. Further, in this case the method preferably further comprises the step of: delaying the release of the acid to help delay the beginning of any substantial reaction between the first reactant and the second reactant. For example, the step of delaying the release of the acid can comprise: including a delayed release acid in the treatment fluid.

The specific solid form of a reactant can be used to control the mixing of the reactants, either the timing of the mixing in stages of release or the rate of a steady release of at least one of the reactants for a controlled steady rate of mixing and reaction, or any combination of such objectives.

For example, according to one embodiment of the invention, the solid form for a reactant comprises: having at least some of at least one of the first reactant and the second reactant is embedded in a solid matrix with a polymeric material.

According to another embodiment of the invention, the solid form comprises for a reactant comprises: having at least some of at least one of the first reactant and the second reactant is encapsulated with a polymeric material capable of helping to control the release of the reactant.

For embedding a reactant in a solid matrix, the embedding material is preferably a polymeric material. More particularly, the polymeric material preferably comprises a biopolymeric material or a derivative of a biopolymeric material. More preferably, the biopolymeric material is selected from the group consisted of hydroxyl alkyl cellulose, xanthan, diutan, guar gum, chitosan, in any combination and in any proportion.

Preferably, the polymeric material is a material that can be hydrated. Thus, when forming a solid matrix, a small proportion of water is added, which preferably is an insufficient proportion to substantially hydrate the polymeric material, but is sufficient to make the polymeric material sticky to help bind the reactant into a matrix. The materials can be mixed together into a solid matrix, which can then be formed into small pellets. These pellets are subsequently dried, for example, in a vacuum oven at about 80° C. for about 12 hours to obtain the final product. In addition to acting as a binder, the polymer-bound dry matrix also acts as a vehicle for a slow release of the reactant salt into solution. The size of these pellets can be varied as desired. Preferably, the pellets vary in size from about 1 to about 10 mm across. If desired, the uniformity of pellet size can be controlled by screening techniques.

For encapsulating a reactant or embedding a reactant in a matrix, the encapsulating or embedding material preferably comprises a water-soluble polymeric material. More preferably, for example, the water-soluble the polymeric material is selected from the group consisting of polyvinyl alcohols, polyvinyl alcohol copolymers, partially hydrolyzed polyvinyl acetate, polyvinyl pyrrolidone, alkyl celluloses, ethers and esters of alkyl cellulosics, hydroxy alkyl, carboxy methyl cellulose sodium, dextrin, maltodextrin, water soluble polyacrylates, water soluble polyacrylamides, acrylic acid/maleic anhydride copolymers, and any combination thereof in any proportion. Based on the teachings of this invention, a person of skill in the art will be able to select particularly appropriate polymeric materials and an appropriate physical solid form to achieve a release of reactant after a desired time or after a desired temperature.

Alternatively, for encapsulating a reactant or embedding a reactant in a matrix, the encapsulating or embedding material can be sensitive to temperature. For example, polyvinyl alcohol or hydrogenated vegetable oil can be used.

Thus, the encapsulating or embedding material can be any material that melts or dissolve in the carrier fluid to release a reactant for an exothermic reaction. Further, the dissolution of the polymeric material would be expected to increase with increasing temperature.

Further, when one portion of one of the reactants is encapsulated in a first polymeric material that releases the reactant at a lower temperature and another portion of the reactant is encapsulated in a second polymeric material that releases the reactant at a higher temperature, it is possible to control the mixing of the reactants in stages. This principle can be extended to release successive portions of a reactant as the temperature of the treatment fluid increases with each successive release of reactants to generate some of the available heat of reaction for all the reactant material in the carrier fluid.

By way of further example, the polymeric material can be selected to dissolve in an acidic solution, wherein the carrier fluid comprises water at a neutral or alkaline pH; and wherein the treatment fluid further comprises a delayed release acid. Upon the delayed release of the acid, the pH of the water in the carrier fluid would become acidic, which can be used to begin to release some of one of the reactants into the carrier fluid. For example, such a polymeric material is chitosan, alone or in combination with sodium alginate, which material would dissolve in an acetic acid solution. Other examples include synthetic, cationic polymers.

According to yet another embodiment of the invention, the solid form comprises: having at least some of at least one of the first reactant and the second reactant in a solid form that is insoluble in neutral water; and wherein the treatment fluid comprises: an agent to increase the solubility of such reactant in water. A specific example of such an embodiment is when the first reactant comprises: magnesium ammonium phosphate in solid form that is soluble in water at a very slow rate of dissolution, and the second reactant comprises a source of nitrite ions; and wherein the agent to increase the rate of dissolution of the magnesium ammonium phosphate comprises a chelating agent. In this embodiment, the chelating agent is preferably selected from the group consisting of: citric acid, alkali salts of ethylenediaminetetraacetic acid ("EDTA"), nitrilotriacetic acid ("NTA"), and any combination thereof in any proportion.

It should be understood, of course, that the techniques of these embodiments can be advantageously and synergistically practiced together in various combinations of two or more techniques to achieve desired mixing of reactants for exothermic reaction after a specific delay period and gradually or in stages.

It is expected that the methods according to the invention will have greatest and most advantageous application when the conduit is a subsea pipeline.

The methods can also preferably further comprise the step of: isolating the section of conduit; and wherein the step of introducing the treatment fluid into the conduit further comprises: introducing into the isolated section of conduit.

The method according to the invention can further preferably comprising the step of: allowing the treatment fluid to generate heat in the conduit. This is important to allow the paraffin wax deposits time to heat up and begin to soften or melt. Preferably, the carrier fluid comprises liquid hydrocarbon that can dissolve the paraffin wax to help remove the deposits. Most preferably, of course, the methods further comprise the step of: displacing the treatment fluid from the section of conduit.

In preferred embodiments, a non-ionic surfactant is added to the treatment fluid, which in addition to providing a detergency effect, can also help to emulsify organic solvents that will aid in dissolving the wax deposits.

The treatment fluid can also have pour point depressants (to modify the structure of the deposited wax) provided antagonistic effects are not observed with the non-ionic surfactants.

In addition to the example of an exothermic reaction between ammonium ion and nitrite ion, the Fenton's Reaction has been known since 1894 and is one of the most powerful oxidizing reactions available. The Fenton's Reaction is of interest because it is highly exothermic.

The Fenton's Reaction involves hydrogen peroxide and a ferrous iron catalyst (Equation 2). The peroxide is broken down into a hydroxide ion and a hydroxyl free radical. The hydroxyl free radical is the primary oxidizing species and can be used to oxidize and break apart organic molecules.

$$H_2O_2+Fe^{2+} \longrightarrow Fe^{3+}+HO^-+HO^* \qquad (Eq. 2)$$

Other similar exothermic reactions with hydrogen peroxide and metal ions are also contemplated to produce oxidizing species, such as the reaction of hydrogen peroxide and copper ions.

It is well known that organic compounds can be easily oxidized. One primary advantage of the Fenton's Reaction is that it does not produce further organic compounds or inorganic solids such as permanganate and dichromate, since there is no carbon in the peroxide.

If the reaction is carried to completion, then ultimately the organic molecules break down into $CO_2$ and water, which are the normal end products of a combustion reaction. Also similar to a regular combustion reaction, organic destruction by the Fenton's Reagent is highly exothermic. Unlike combustion, however, Fenton's Reaction is associated with foaming, often very heavy and thick in the early parts of the reaction, especially for large compounds with high amounts of carbon.

However, there are organic species that show resistance to oxidation by the Fenton's Reaction. Small chlorinated alkanes, n-paraffins, and short-chain carboxylic acids, compounds that are typical oxidation products of larger molecules, seem to resist further fragmentation by the Fenton's Reaction. Nevertheless, it is expected that Fenton's Reaction can be used to oxidize hydrocarbon as one of the reactants to generate heat included in the carrier fluid. Even if not particularly reactive with paraffin wax already in the conduit to be treated, the heat generated by Fenton's Reaction with the hydrocarbon in the carrier fluid can be used to melt and help dissolve the paraffin wax. The heat of this reaction would be expected to be limited by the amount of hydrogen peroxide and ferrous iron used in the treatment fluid, and an excess of hydrocarbon would be used for dissolving the paraffin wax in the conduit.

Another example of a highly exothermic reaction is the reaction of ammonia with carbon dioxide to form urea, $H_2NC(O)NH_2$, a water-soluble compound made by many organisms, including humans, to eliminate nitrogen, according to the following reaction (Equation 5):

$$2NH_3(g)+CO_2(g) \longrightarrow H_2NC(O)NH_2(s)+H_2O(l) \qquad (Eq. 3)$$

The standard enthalpies of formation ("H°f") for ammonia, carbon dioxide, urea, and water are −46.1, −393.5, −333.0, and −285.8 kJ/mole, respectively. Accordingly, the theoretical enthalpy change for the reaction ("Hrxn")=H°f(H2O(l))+ H°f(H$_2$NC(O)NH$_2$(s))−2H°f(NH$_3$(g))−H°f(CO$_2$(g))=(−285.8 kJ)+(−333.0 kJ)−(−92.2 kJ)−(−393.5 kJ)=−133.1 kJ/mole (based on the amount of carbon dioxide).

Another highly exothermic class of reactions is Grignard reactions, for which the heat of reaction is typically in the range of about −200 to about −250 kJ/mole.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A method for increasing the temperature of a section of conduit used for the production or transmission of hydrocarbon, the method comprising the steps of:
    (a) forming a treatment fluid comprising:
        (i) a carrier fluid; and
        (ii) a first reactant and a second reactant, wherein:
            (1) the first reactant and second reactant are selected for being capable of reacting together in an exothermic chemical reaction;
            (2) the first and second reactant are in at least sufficient concentrations in the carrier fluid to generate a theoretical heat of reaction of at least 1,000 kJ/liter of the treatment fluid; and
            (3) at least some of at least one of the first reactant and the second reactant is suspended in the carrier fluid in a solid form that is adapted to help control the initial release of the reactant into the carrier fluid and wherein the solid form is adapted to help control the release so that
                (a) less than 50% of the total heat of the reaction is generated within any 1 hour period; and
                (b) greater than 50% of the total heat of the reaction is generated within a period of at most 6 hours; and
    (b) introducing the treatment fluid into a section of conduit used for the production or transmission of hydrocarbon.

2. The method according to claim 1, wherein the solid form comprises at least two different solid forms adapted to help control the mixing between the first reactant and the second reactant in at least two stages.

3. The method according to claim 1, wherein the solid form substantially comprises particulate material having a 20-40 mesh size.

4. The method according to claim 1, wherein the carrier fluid comprises a viscosifying agent.

5. The method according to claim 1, wherein the carrier fluid comprises a non-ionic surfactant.

6. The method according to claim 1, wherein the carrier fluid comprises water.

7. The method according to claim 1, wherein each of the first reactant and the second reactant comprises a water-soluble material.

8. The method according to claim 7, wherein:
    (a) the first reactant comprises: water-soluble cations; and
    (b) the second reactant comprises: water-soluble anions.

9. The method according to claim 8, wherein:
    (a) the water-soluble cations comprise: ammonium ions; and
    (b) the water-soluble anions comprise: nitrite ions.

10. The method according to claim 1, wherein the treatment fluid further comprises: a catalyst for an exothermic chemical reaction between the first reactant and the second reactant.

11. The method according to claim 10, further comprising the step of: delaying the release of the catalyst to help delay the beginning of any substantial reaction between the first reactant and the second reactant.

12. The method according to claim 11, wherein the step of delaying the release of the catalyst comprises: encapsulating the catalyst.

13. The method according to claim 10, wherein the catalyst comprises an acid.

14. The method according to claim 13, further comprising the step of: forming the treatment fluid with a buffer to help delay the release of the acid.

15. The method according to claim 1, wherein the solid form comprises: having at least some of at least one of the first reactant and the second reactant embedded in a solid matrix with a polymeric material.

16. The method according to claim 1, wherein the solid form comprises: having at least some of at least one of the first reactant and the second reactant encapsulated with an encapsulating material capable of helping to control the release of the reactant.

17. The method according to claim 16, wherein the encapsulating material is a material that releases the encapsulated reactant at a temperature above 120° F. (49° C.).

18. The method according to claim 17, wherein the encapsulating material comprises polyvinyl alcohol.

19. The method according to claim 1, further comprising the step of: isolating the section of conduit; and wherein the step of introducing the treatment fluid into the conduit further comprises: introducing into the isolated section of conduit.

20. The method according to claim 1, further comprising the step of: displacing the treatment fluid from the section of conduit.

21. A method for increasing the temperature of a section of conduit used for the production or transmission of hydrocarbon, the method comprising the steps of:

(a) forming a treatment fluid comprising:
  (i) a carrier fluid comprising water; and
  (ii) a first reactant and a second reactant, wherein:
    (1) the first reactant comprises a source of ammonium ions and the second reactant comprises a source of nitrite ions, wherein the first reactant and second reactant are capable of reacting together in an exothermic chemical reaction;
    (2) the first and second reactant are in at least sufficient concentrations in the carrier fluid to generate a theoretical heat of reaction of at least 1,000 kJ/liter of the treatment fluid; and
    (3) at least some of at least one of the first reactant and the second reactant is suspended in the carrier fluid in a solid form that is adapted to help control the initial release of the reactant into the carrier fluid and wherein the solid form is adapted to help control the release so that
      (a) less than 50% of the total heat of the reaction is generated within any 1 hour period; and
      (b) greater than 50% of the total heat of the reaction is generated within a period of at most 6 hours; and (b) introducing the treatment fluid into a section of conduit used for the production or transmission of hydrocarbon.

\* \* \* \* \*

UNITED STATES PATENT AND TRADEMARK OFFICE
CERTIFICATE OF CORRECTION

PATENT NO. : 7,624,743 B2 Page 1 of 1
APPLICATION NO. : 11/521530
DATED : December 1, 2009
INVENTOR(S) : Sarkar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Twenty-sixth Day of October, 2010

David J. Kappos
*Director of the United States Patent and Trademark Office*